No. 735,022.  
Patented July 28, 1903.

UNITED STATES PATENT OFFICE.

FRANK J. TONE, OF NIAGARA FALLS, NEW YORK.

REFRACTORY BRICK OR ARTICLE.

SPECIFICATION forming part of Letters Patent No. 735,022, dated July 28, 1903.

Application filed December 6, 1902. Serial No. 134,181. (No specimens.)

*To all whom it may concern:*

Be it known that I, FRANK J. TONE, of Niagara Falls, Niagara county, New York, have invented a new and useful Improvement in Refractory Articles, of which the following is a specification.

Difficulty has been experienced in the manufacture of silica bricks or blocks, which are usually made from silica in the form in which it is found in silica rock or ganister. This material is abundant, and on account of its refractory powers it is very desirable. It has, however, when in a substantially pure state very little cohesion, so that to compact it and render it durable it is necessary to add a binding material to cause the particles to cohere. The material generally used for this purpose is lime in the proportion of two or three per cent. It acts as a fluxing material, and the calcium silicate which forms as a result of the combination with the silica reduces the fusion-point of the brick materially below that of pure silica, and is therefore objectionable for many uses to which the brick may be put. Like difficulties are present in the manufacture of bricks from alumina, bauxite, chrome ore, or magnesite. I have discovered that an excellent binding material for such non-coherent refractory oxids is powdered carborundum. When used as I will describe, it binds the particles of the brick closely together, and instead of lowering the fusion-point of the brick it substantially raises it.

In the practice of my invention in making bricks from silica rock or ganister I reduce this material to the degree of fineness ordinarily desired in making fire-brick, preferably to granular form, and mix with it powdered carborundum. I have found that excellent results are obtained by the use of fifty parts of carborundum and fifty parts of silica rock; but the proportions may be varied without departure from my invention. The mixture of silica and carborundum is mixed with water and pressed in suitable molds into the required shape and is then fired in a kiln in the manner usual in the manufacture of fire-brick. On removing the bricks from the kiln they will be found to possess great coherence and tenacity. They are very refractory and undergo very little expansion or contraction in the changes of temperature. In the manufacture of bricks of bauxite, chrome, or magnesite a like procedure is followed and like proportions of powdered carborundum may be employed. In all such cases important advantages are obtained and fire-bricks are produced more refractory and otherwise better than have heretofore been known to me. Lime, however, is not suitable material for the manufacture of the bricks.

My process is useful not only in the manufacture of bricks or blocks, but in the manufacture of crucibles and other refractory articles.

I am aware that bricks and other articles have been made of carborundum bonded with ordinary bonding materials; but such articles are substantially different from mine, since I employ carborundum as a bond for refractory non-coherent or defectively-coherent material. In former cases the carborundum is the material which is bonded and in my articles the carborundum is the bond.

I claim—

1. A baked refractory article composed of a refractory material non-coherent when used alone mixed with and bonded by carborundum; substantially as described.

2. A baked refractory article composed of a refractory oxid, mixed with and bonded by carborundum; substantially as described.

3. A baked refractory article composed of silica bonded by carborundum; substantially as described.

4. A baked refractory article composed of granular silica bonded by carborundum; substantially as described.

In testimony whereof I have hereunto set my hand December 5, 1902.

FRANK J. TONE.

Witnesses:
THOMAS W. BAKEWELL,
H. M. CORWIN.